US006390023B1

(12) United States Patent
Reynolds (10) Patent No.: US 6,390,023 B1
(45) Date of Patent: May 21, 2002

(54) GROUND WATER THERMAL TRANSFER METHOD AND APPARATUS

(76) Inventor: Ray D. Reynolds, South Wells Highway 93, Wells, NV (US) 89835

( * ) Notice: Subject to any disclaimer, the term of this patent is extended or adjusted under 35 U.S.C. 154(b) by 0 days.

(21) Appl. No.: 09/749,224

(22) Filed: Dec. 26, 2000

(51) Int. Cl.[7] .................................................. A01K 7/00
(52) U.S. Cl. ........................................................ 119/72
(58) Field of Search ............................ 119/72, 69.5, 73, 119/74, 78; 239/24

(56) References Cited

U.S. PATENT DOCUMENTS

| 993,273 | A | * | 5/1911 | Quimby | |
|---|---|---|---|---|---|
| 1,576,218 | A | * | 3/1926 | Powell | |
| 1,977,346 | A | * | 10/1934 | Moorman | |
| 2,446,695 | A | * | 8/1948 | Didget | |
| 2,629,040 | A | * | 2/1953 | Smith | |
| 3,023,770 | A | * | 3/1962 | Godshalk | |
| 4,465,020 | A | * | 8/1984 | Schafer | 119/73 |
| 4,930,572 | A | * | 6/1990 | Doshier | 119/73 |
| 6,167,945 | B1 | * | 1/2001 | Bottum, Sr. et al. | 119/73 |

* cited by examiner

Primary Examiner—Thomas Price
(74) Attorney, Agent, or Firm—Herbert C. Schulze (57) ABSTRACT

A drinking water facility for animals includes an elongate tank with an open upper end at or above ground level extending to a closed end below ground frost line with a water inlet source into the tank below the frost line. A pipe located within the tank serves as a conduit to cause a constant current through the pipe and exterior to pipe to prevent freezing of water in the tank. An induced Bernoulli effect aid in the proper circulation of water.

11 Claims, 5 Drawing Sheets

GROUND WATER THERMAL TRANSFER METHOD AND APPARATUS

CROSS REFERENCE TO RELATED PATENT APPLICATIONS

There are no patent applications filed by me related to the within application.

BACKGROUND OF THE INVENTION

I. Field of the Invention

This invention is in the general field of systems for preventing freezing of water in open basins during periods of below freezing temperatures;

The invention is more particularly in the field of such systems wherein the temperature of the water in such basins is maintained by use of soil temperature at a level below the frost line (the level above which soil is frozen and below which the soil is not frozen).

The invention is most particularly in a new, novel, unique, and useful method for causing automatic and continuous circulation of water in a basin in the soil which extends through zones both above and below the frost line II. Description of the Prior Art There have been a number of attempts to harness the thermal energy existing below the frost line to prevent water from freezing. All of the attempts have been in essentially in the same manner. All of these attempts rely on one or another method of merely mixing warmer water entering a basin, such as a livestock watering tank, at a position below the frost line, or relying upon mingling of the water throughout the entire tank or basin. Under very severe cold conditions there is a general complete stagnation of any water flow, particularly at the top of the tank.

Very cold water is heavier than less cold water. Thus, when a tank is being used to practice this general method the colder water has a tendency to descend, with warmer water rising. However, there comes a point when the opposite occurs. As the temperature of water decreases to actual freezing, the commencement of ice formation then brings that water, as ice being formed, to the top, since the ice is considerably lighter than water.

The prior art is well documented by patents and literature. The state of the prior art can best be understood by an examination of two United States Patents:

U.S. Pat. No. 5,003,928 is an example of one approach to this matter. In this approach, an elongate tank is installed into soil for a distance which carries the bottom of the tank below the frost line. The top portion of the tank is insulated about its exterior. The water itself is covered by a floating disc. The theory is that the disk can be pushed down by livestock so as to enable the animals to drink from the top of the disc. Then, when the level of the water falls, it will be replaced by an intake from a water supply which is in the soil below the frost line. This new water, will then circulate upward in the tank. This theory is proper, but it fails to take into account the fact the new water is at a temperature in equilibrium with the water in the tank below the frost line. Being a large body of water it is relatively stagnate and motionless except for those periods in which the water is actually entering, and swirling as set forth in the patent referred to. Therefore, when animals are not actively drinking, the water in the tank can freeze rather easily, with the principal inhibition to freezing at the top being the floating disc and the insulated collar. However, the floating disc can even be a detriment under some circumstance as water between the periphery of the disk and inner edge of the top of the tank is more or less prevented from moving, thus providing an excellent condition for ice formation;

U.S. Pat. No. 5,908,008 is typical of another approach wherein a pumping and circulation system is provided. While this approach may be effective in preventing freezing, the cost of installation, operation, and maintenance of such systems is a tremendous drawback, and will make it impractical for many purposes. For example, in remote areas such as national forest areas, where water supplies are desired for wild animals it may not be possible to have the electrical, or other, power required to operate such systems.

Other attempts have included the use of air blowers over the top of the water, various types of heaters, various powered circulation systems, and the like.

I studied all types of material on this subject, and yet I am always led back to the basic systems described above.

I have now, conceived, and developed a system, which is now in operation, and which requires no external nor supplemental power, or the like. This will be described completely below. There are several embodiments of my invention. By developing different embodiments I am able to adapt to various climatic conditions with the most economical approach for each given condition.

None of the prior art discussed here, nor found by me anyplace, has suggested, nor anticipated, my new, unique, useful, and novel method and apparatus which is described in this patent application.

SUMMARY OF THE INVENTION

Providing drinking water for animals is an extremely difficult and costly problem for farmers, wild life conservators, and others in cold climates. The animals must have plenty of drinking water during periods of extreme cold. Yet, available water freezes and cannot be accessed by the average range animal, wild animals, and others.

The problem in supplying water for animals under harsh conditions has resulted in many different approaches. Various means of heating drinking water, breaking surface ice, circulating pumping systems have been tried.

One approach has been to attempt to utilize the heat stored in soil below the frost line. The frost line is defined as the point below ground surface where the soil is not frozen. Below the frost line, the soil, while cold, still carries enough latent heat to prevent water from freezing.

Numerous attempts to circulate water from below the frost line have been made. In the Description of the prior art, above, I have recited the more important attempts to utilize this principle. Unfortunately, the various attempts which have been made before my present invention have been deficient, or less than practical, or not economical as previously recited under the description of the prior art.

One of the problems which has been difficult to solve is the relative stagnation of water around the periphery in a large container such as a tank large enough to allow drinking by large animals. Since the water around the periphery of the container is practically motionless ice forms rather quickly about the edges of the container. Once the ice commences to form it rather rapidly covers the entire surface.

Utilizing the difference in ground temperature below the frost line, a tank with a substantial portion below the frost line has a tendency to have circulation due to the tendency of very cold water near the top to become heavier than the rest of the water, and thus to sink, creating somewhat constant rising and falling currents. These naturally occurring currents, however, fail to produce enough mixing and agitation to prevent the initial formation of ice on the surface, particularly around the upper edges of a large container.

I have found that some persons working in this field have attempted to cause water entering, or already in the container to swirl. However, such attempts have generally been less than fully effective for a variety of reasons. Among others, the problems in causing effective swirling usually require some sort of power. The power is generally not available, or available only at a very high cost, in the areas in which animal drinking water is required.

Some attempts at causing swirling have been directed to specially shaped water intake pipes and the like. These attempts are very limited in that water is not constantly entering animal drinking containers. Also, the float valves commonly used for controlling the intake of water can easily become fouled or impaired due to the cold and other factors.

Other attempts to assist in preventing ice formation have included blowing heated air over the surface of the water. Once again, such an approach generally fails due to the lack of appropriate power and due to the excessive cost.

I have finally conceived and perfected a unique, novel, and useful system, which has now been operating a sufficient length of time to be thoroughly proven, by which I can maintain animal drinking containers without formation of ice throughout extremely adverse weather conditions and without any external power or other assistance.

I have accomplished this by unique mechanical structures in which I channel cold water at the uppermost level in an open tank into a definable stream and direct warmer water within the tank into a restricted zone about the periphery of an open edge of a drinking container. I have discovered that, among other innovations, I can create a Bernoulli effect by a proper mounting of a pipe within a tank, as will be disclosed in more detail below.

In perfecting my method and apparatus I have been able to now provide an economical solution to this old and troublesome problem of maintaining proper drinking water availability for animals, even in remote and harsh circumstances. Also, by using diaphragm valves in an usual manner I have avoided fouling and mis-functioning of intake water systems.

It is an object of this invention to provide a method for preventing freezing of water in outdoor containers;

Another object of this invention is to cause currents to flow in defined paths in a large outdoor water container under freezing conditions such that the water does not freeze;

Another object of this invention is to create Bernoulli effect acceleration and circulation in certain areas of a drinking water tank;

Another object of this invention is prevent fouling or malfunctioning of intake water supplies in animal drinking facilities;

Another object of this invention is to provide such systems for prevention of freezing water which can be utilized in different embodiments to provide the most economical system for any given climatic condition.

The foregoing and other objects and advantages of this invention will become apparent to those skilled in the art upon reading the descriptions of a preferred embodiments, which follow, in conjunction with a review of the appended drawings.

DESCRIPTION OF A PREFERRED EMBODIMENT

An inventory of the items bearing reference numerals on the drawings is:
Numeral Item
10 apparatus suitable to practice methods of this invention
20 tank
22 closed bottom of tank
24 open top of tank
28 spacers
30 inner pipe
32 funnel
34 upper funnel lip
40 pipe support boss
42 Pointed top of pipe support boss
50 pipe support plate
52 openings in pipe support plate
54 Pipe support webs
60 water level
70 water source for replenishing water in tank
62 coldest water starting to descend
62a cold water being directed and accelerated by funnel
62b accelerated cold water nearing bottom of
62c cold water leaving pipe with Bernoulli effect
62d warmed water rising about pipe
62e warmed water flowing between funnel lip and tank edge
71 water intake conduit
72 diaphragm valve
75 diaphragm valve vent
80 ground level
90 frost line
120 tank
122 closed bottom of tank
124 open top of tank
128 spacers
130 inner pipe
132 funnel
134 upper funnel lip
140 pipe support boss
142 pointed top of pipe support boss
150 pipe support plate
152 openings in pipe support plate
154 Pipe support webs
160 water level
160a water source for replenishing water in tank
162 coldest water starting to descend
162a cold water being directed and accelerated by funnel
162b accelerated cold water nearing bottom of pipe
162c cold water leaving pipe with Bernoulli effect
162d warmed water rising about pipe
162e warmed water flowing between funnel lip and tank edge
171 water intake conduit
172 diaphragm valve
175 diaphragm valve vent
222 closed bottom of tank
224 open top of tank
228 sleeve 230 inner pipe
232 funnel
234 upper funnel lip
240 pipe support boss
242 pointed top of pipe support boss
250 pipe support plate
252 openings in pipe support plate
254 pipe support webs
260 water level
260a water source for replenishing water in tank
262 coldest water starting to descend
262a cold water being directed and accelerated by funnel
262b accelerated cold water nearing bottom of pipe
262c cold water leaving pipe with Bernoulli effect
262d warmed water rising about pipe
262e warmed water flowing between funnel lip and tank edge
271 water intake conduit
272 diaphragm valve
275 valve vent
300 sleeve surrounding tank 220
302 closure between top of tank 220 and sleeve 300
304 closure between tank 220 and sleeve 300 at frost line
310 space between tank 20 and sleeve 300

An apparatus 10 suitable to practice the method of this invention is shown in the drawings FIGS. 1, 2, 3, and 4. FIGS. 2A and 2B illustrate two superior alternate embodiments with additional unique, novel, and useful features.

Figure 1:
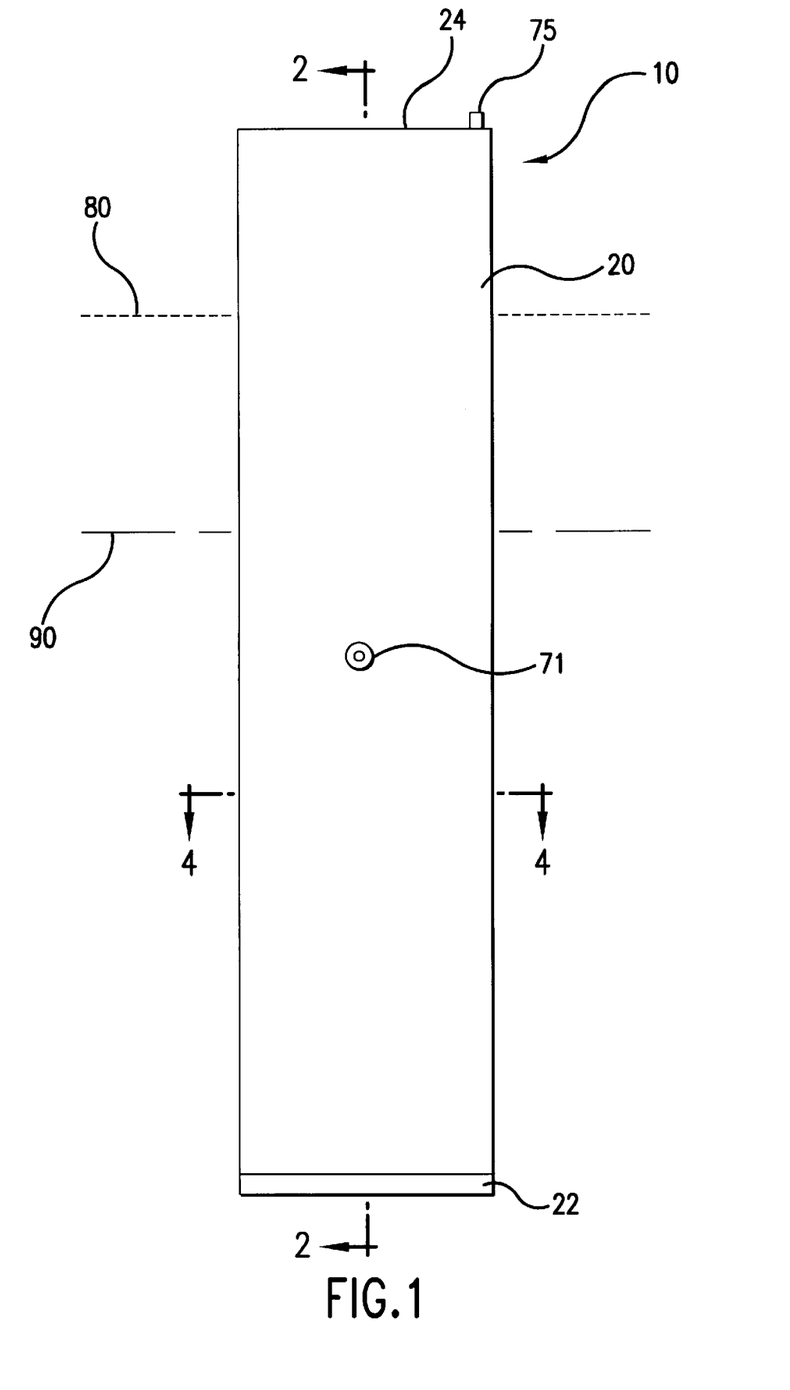
FIG. 1 is a side elevation of an apparatus suitable to practice the method of this invention.

FIG. 1 is a side elevation of the apparatus 10 located within soil (the soil is removed from the facing side of the apparatus in order to display the apparatus clearly. The top level, or surface (ground level)80 of the soil is indicated by the dashed ( - - - ) line 80. The frost line 90 is indicated by the broken ((— — — — — — —)) line 90. The distance the open top 24 of cylindrical tank 20 extends above ground level 80 will depend upon factors which may be specific for different purposes. For example, if the water is to be used as drinking water for small animals such as sheep, the distance from the top of the tank to ground level may be less than such distance for cattle or horses. This will be understood by those skilled in the art. The frost line will depend upon the weather conditions and other natural factors. The frost line will generally be out of the control of those practicing the method of this invention, as will be understood by those skilled in the art. The bottom 22 of the tank will be welded, or otherwise fastened in an impervious manner, to the cylindrical tank portion 20. Water intake source 60a will normally be located well below the frost line in order to prevent freezing. Water intake conduit 71 will enter the tank 20 below the frost line.

Figure 2:
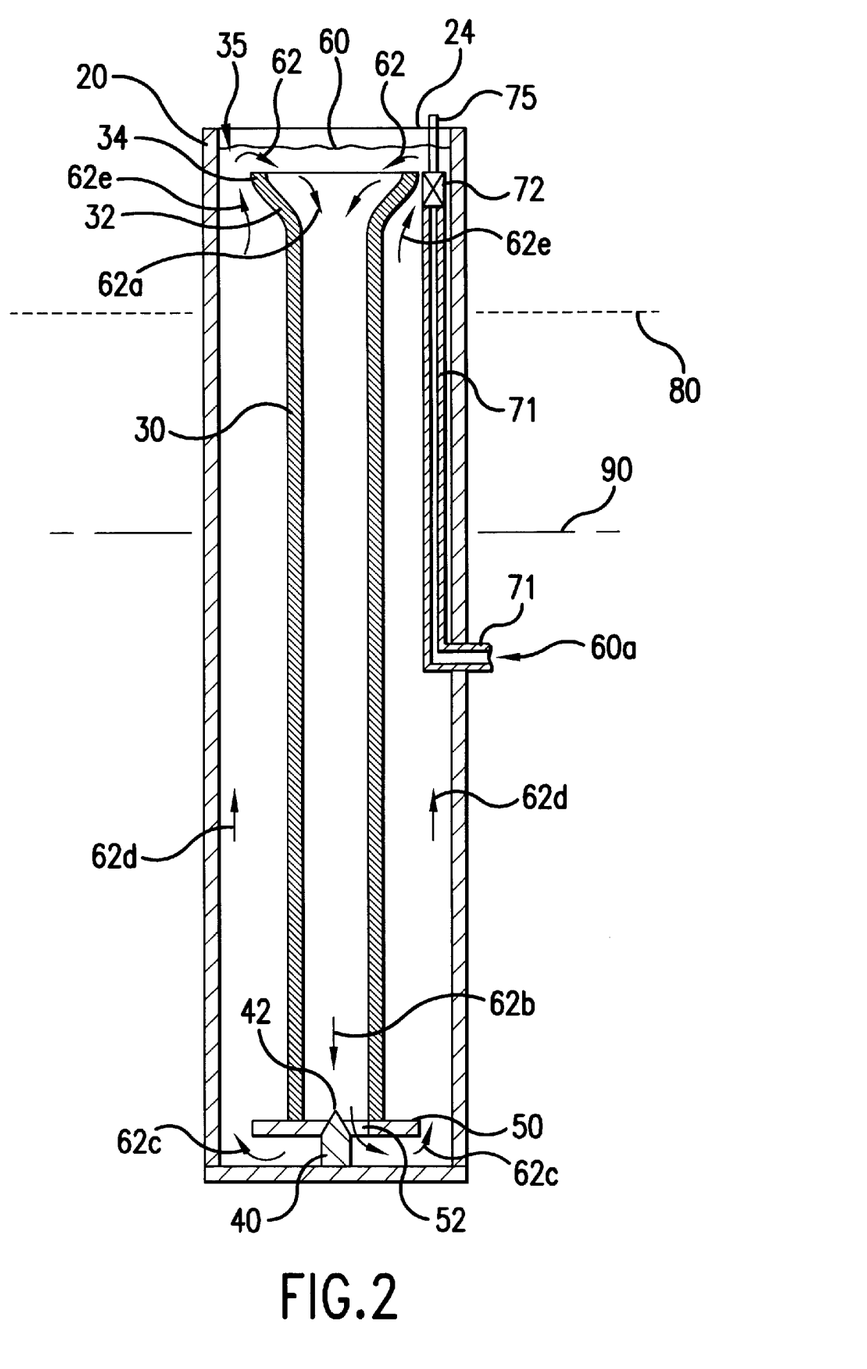
FIG. 2 is a section on 2—2 on FIG. 1.
Figure 2A:
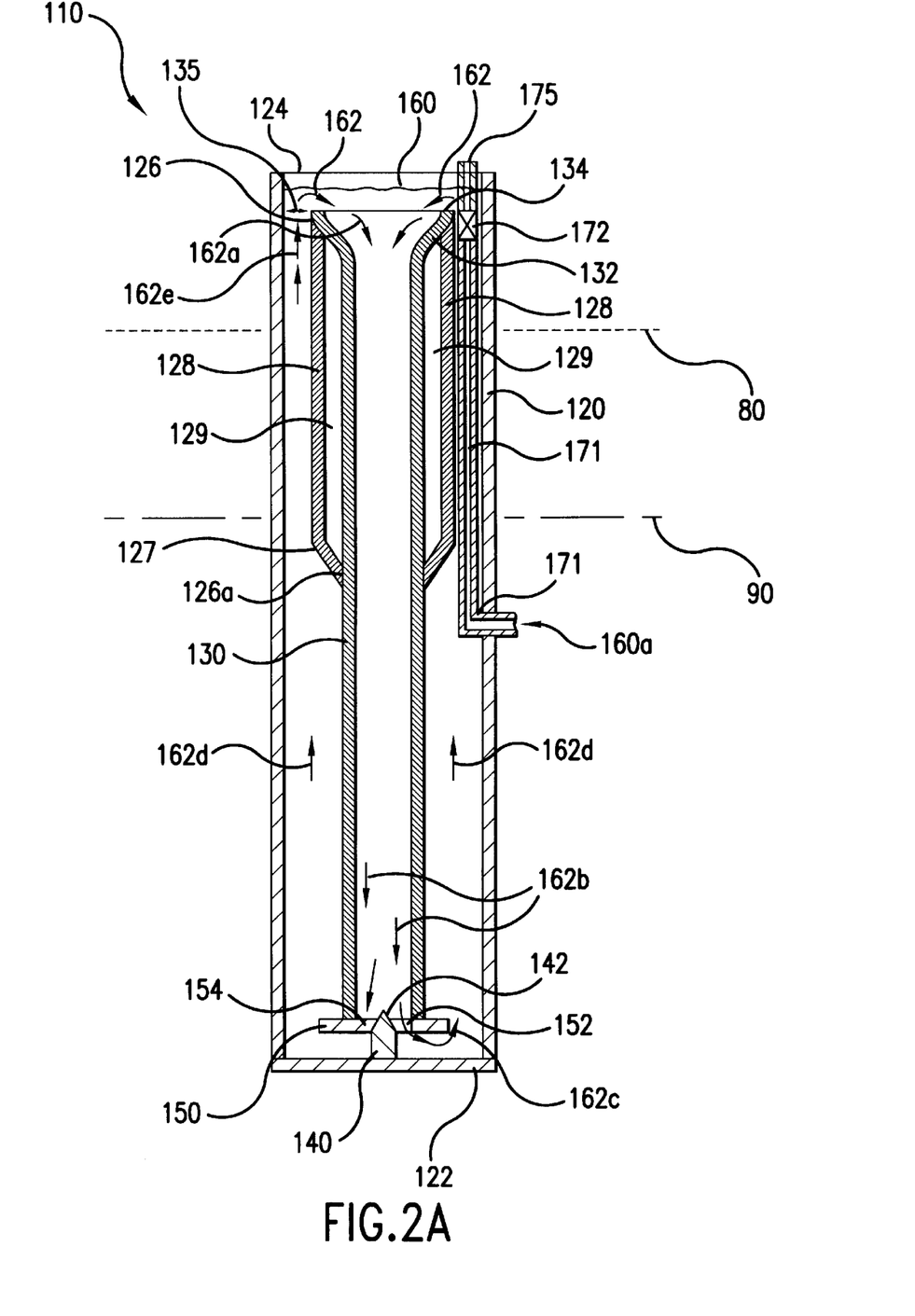
FIG. 2A is a view as FIG. 2, but with a first alternate internal construction.
Figure 2B:
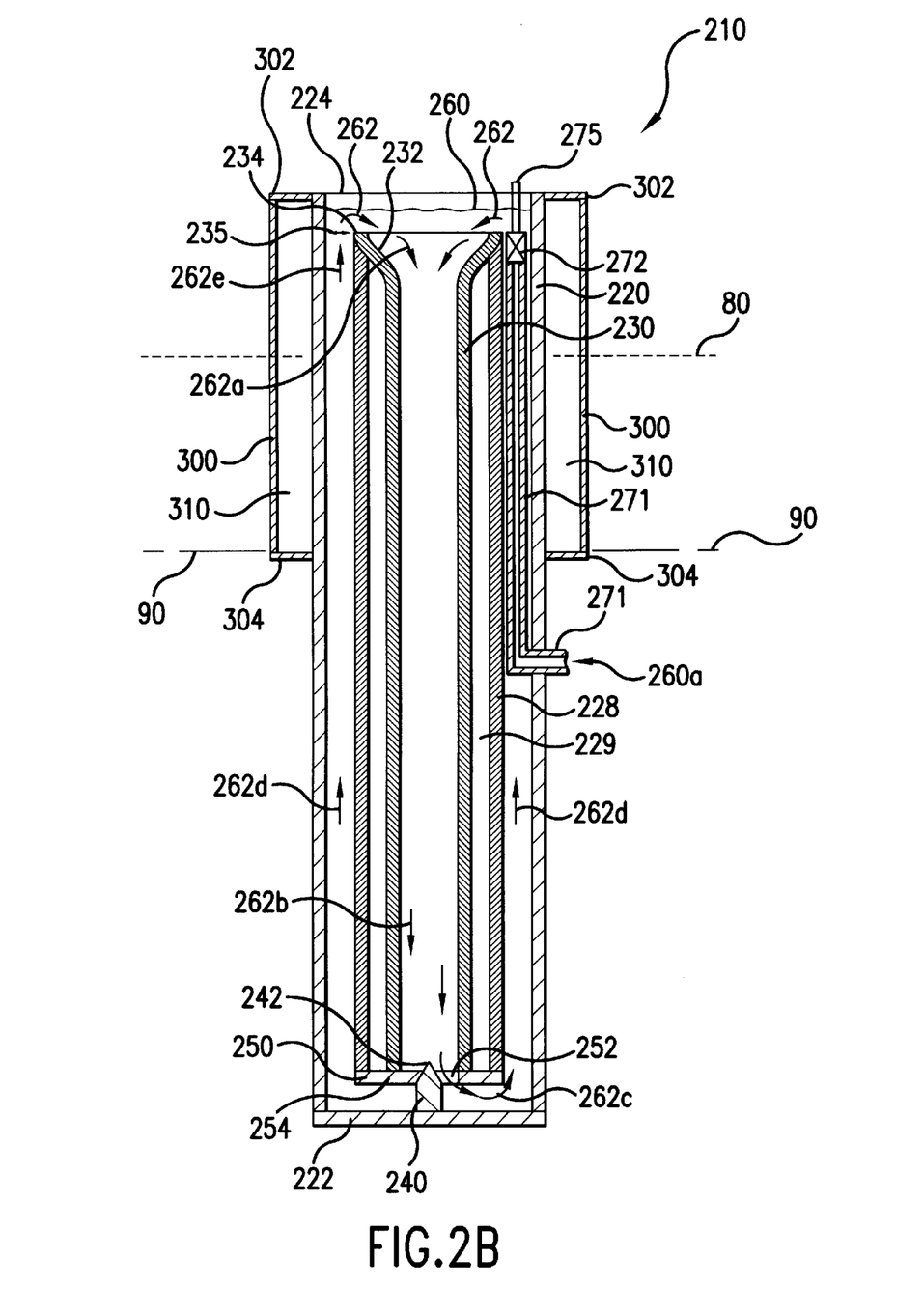
FIG. 2B is a view as FIG. 2, but with a second alternate internal construction.
Figure 3:
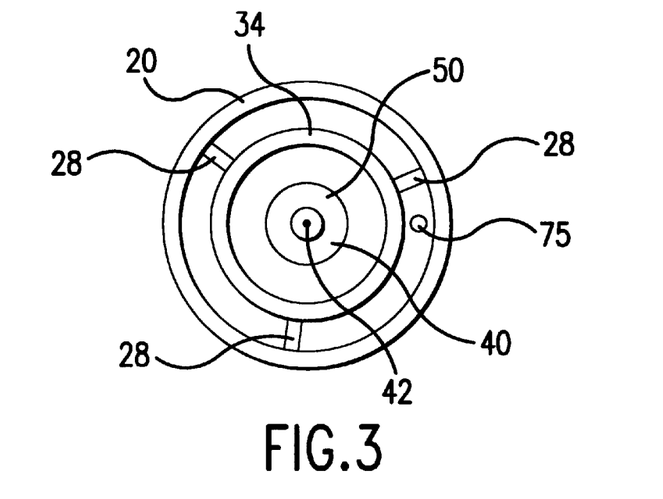
FIG. 3 is a top elevation of the apparatus of FIG. 1.
Figure 4:
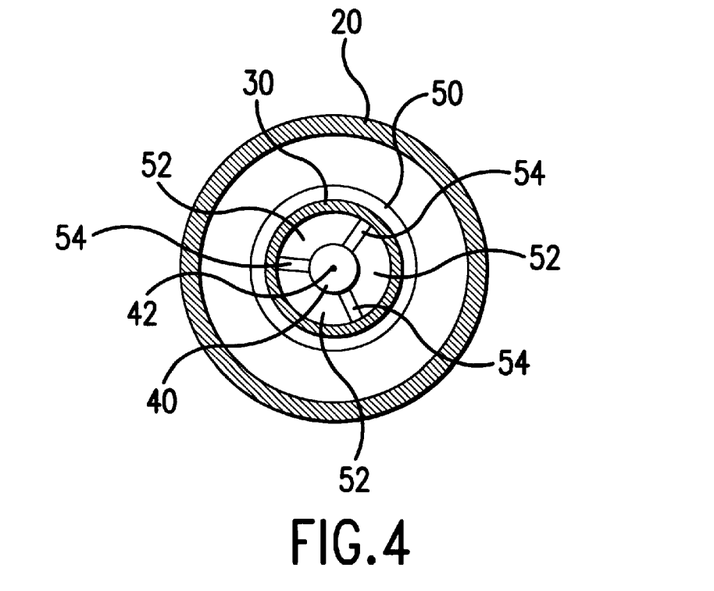
FIG. 4 is section on 4—4 on FIG. 2.

FIG. 2 is a section on 2—2 on FIG. 1. In this case, as in FIG. 1, the apparatus is shown in the ground relative to the ground level and the frost line, but with the soil not shown in the area defined by the tank for clarity.

The cylindrical tank portion 20 is open at the top 24 and closed at the bottom 22 as previously mentioned. A pipe support boss 40 is affixed to the bottom 22 of the tank by welding or other suitable means known to those skilled in the art. The pipe support boss will be pointed at its upper end 42 in order to facilitate positioning of pipe 30. The pipe 30 rests on support plate webs 54 of the support plate 50. Openings 52 between the webs 54 provide areas for water to travel through from the interior of pipe 30 to the exterior of pipe 30 within cylindrical tank 20. The openings 52 are shown as unshaped openings in the support plate. Such unshaped openings will allow flow of water, and they will create a Bernoulli effect. As will be known to those skilled in the art, any restricted opening can create a Bernoulli effect. In a particularly effective embodiment of this invention the openings will be specially shaped (not shown, but known to those skilled in the art) so that the openings will create a maximum Bernoulli effect. In creating a Bernoulli effect I aid in the effectiveness of the present invention by creating unusual speed and turbulent circulation of the warmed water from the bottom of the inner pipe upwardly into the critical area between the inner edge of the tank and the outer edge of the interior pipe funnel. This results in the warmer water maintaining more of its thermal heat as well as speeding the water circulation around the interior of the upper edge of the tank.

The top of the inner pipe 30 is formed as shown in the shape of a funnel 32 with an upstanding lip 34. The water level within tank 20 is at, or close to, the upper edge 24 of tank 20. If desired a series of spacers 28 may be utilized in order to prevent any possible wavering of the funnel and inner pipe.

A continuous flow of water within the tank takes place, powered by the temperature differential between the atmosphere and the ground above the frost line and the temperature below the frost line. I will describe the way in which the water is caused to move by my invention by picking certain positions to show the movement of the water. It will be best understood if each point described, 62, 62a, 62b, 62c, 62d, and 62e be considered to be the position of a single molecule of water which moves from the surface 60 of the water downward and subsequently upward, returning to the surface 60 and then repeating its same path. This same reasoning should be applied to the descriptions of the versions of my invention shown in FIGS. 2A and 2B and described below.

At the tank water level the water becomes its coldest 62. The coldest water increases in weight, as is known to those skilled in the art. This heavy, cold water begins to descend 62a down the inner pipe 30. This cold water continues downward within the inner pipe until it reaches the support plate 50. At this point, the Bernoulli effect of the water passing through orifices 52 speeds the water 62b–62c. This water now commences to warm and rise 62d due to heat being obtained from the ground below the frost line. At 62e there is again somewhat of a Bernoulli effect due to the constriction at 35 between the edge 34 of the funnel and the inner edge of the tank 20. At this point, the accelerating turbulent water clears any ice which may be attempting to form around the upper edge of the tank. This is a very important part of my invention. Always, in the past, when others attempted to take some sort of advantage of the latent heat in the soil below the frost line, they have utilized coils or the like to attempt to heat the water. However, such attempts do not accomplish what I have accomplished, and they do not attack the problem of ice forming around the edge of a body of water. At this point, where the water in my system is circulating around the edge, the water 62 is now, again, at its coldest and the cycle repeats.

Of course, it is necessary to replenish water which animals have consumed. Therefore, anyone working in this field finds it necessary to have a source of water into the actual livestock drinking container. This will normally be brought in below the frost line as I have done at 60a–71. The amount and level of the water is customarily controlled by a float valve, as will be understood by those skilled in the art. The problem here is that the float valve will frequently fail due to ice, or other debris. I have now discovered that I can use a diaphragm valve 72 with greatly improved performance. It is generally considered that a diaphragm valve will not operate properly is such a condition. I have discovered that by venting the valve to the atmosphere I have accomplished improved reliability for water replenishment.

In FIG. 2A I have illustrated a superior version of my invention. The reference numerals for the most part are similar to those previously discussed except that they are in the 100 series. In this case the device 110 includes a cylindrical tank 120, an inner pipe 130, inner pipe support mechanism 140 tapering to a point 142, with pipe support plate 150 having support webs 154 and Bernoulli effect orifices or openings 152.

At the tank water level 160 the water 162 becomes its coldest. The coldest water increases in weight, as is known to those skilled in the art. This heavy, cold water 162a begins to descend down the inner pipe 130. The inner pipe 130 and funnel 132 are surrounded by a sleeve 128 which is connected to pipe 130 by an angular flange 127. The sleeve 128 extends down from the funnel lip 134 to a point at, or below, the frost line 90. The space 129 between the sleeve 128 and pipe 130 may be vacuumed or filled with insulating material, or merely sealed while filled with air. For maximum effect in connection with my overall system, space 129 will be vacuumed. As second best space 129 will be filled with insulation. With this insulated, double wall to the frost line, the cold water continues downward within the inner pipe with little change in temperature and weight until it reaches the frost line. Below the frost line, water fills the space between the tank 120 and pipe 130. An insignificant warming will begin to affect the water in pipe 130 from the frost line to support plate 150. At this point, the Bernoulli effect of the water passing through orifices 152 acelerates the water 162b–162c. This water now commences to warm and rise 162d due to heat being obtained from the ground below the frost line. The rising water 162d is warmed as it circulates upward until the frost line. From the frost line to the funnel lip 134 there is again somewhat of a Bernoulli effect due to the constriction at 135 between the outer surface of sleeve 128 and the inner surface of the tank 120. At this point, the affect is that the accelerating and turbulent water clears any ice which may be attempting to form around the upper edge of the tank. When the water in my system is circulating around the edge, the water 162 is now at its coldest and the cycle repeats.

A diaphragm valve 172 below the water surface 160 with vent 175 exterior of the water provides excellent water intake control.

In FIG. 2B I have illustrated another superior version of my invention. The reference numerals for the most part are similar to those previously discussed except that they are in the 200 series. In this case the device 210 includes a cylindrical tank 220, an inner pipe 230, inner pipe support mechanism 240 tapering to a point 242, with pipe support plate 250 having support webs 254 and Bernoulli effect orifices or openings 252.

At the tank water level 260 the water 262 becomes its coldest. The coldest water increases in weight, as is known to those skilled in the art. This heavy, cold water 262a begins to descend down the inner pipe 230. The inner pipe 230 and funnel 232 are surrounded by sleeve 228 which is connected to pipe 230 by a solid outer ring on the support plate 250. The space 229 between the pipes 228 and 230 may be vacuumed or filled with insulating material, or merely sealed while filled with air. As mentioned in the discussion of the version of my invention shown in FIG. 2A, for maximum effect in connection with my overall system, the space will be vacuumed or filled with insulation. With this double wall pipe, the cold water continues downward within the inner pipe with little change in temperature and weight until it is expelled out of the Bernoulli effect orifices 252 in the support plate. At this point, the Bernoulli effect on the water passing through orifices 252 acelerates the water 262b–262c. This water commences to warm and rise 262d due to heat being obtained from the ground below the frost line. The rising water 262d is warmed as it circulates upward until the frost line. From the frost line to the funnel lip 134 there is again somewhat of a Bernoulli effect due to the constriction 235 between the outer edges 234 of the funnel and sleeve 228 and the inner edge of the tank 220. The acelerating and turbulent water clears any ice which may be attempting to form around the upper edge of the tank. The water 262 in my system is now circulating around the edge, the water 262 is now at its coldest and the cycle repeats.

I use a diaphragm valve 272 below the surface with a vent 275 exterior of the water to control water intake.

In the claims which follow I may fail to claim some patentable feature or features. If I do fail to claim such a feature it will be due to inadvertence or oversight, and not due to a dedication or abandonment of such feature. In such event, upon discovering any such failure to claim, I shall immediately seek to cure such failure to claim by reissue or other appropriate remedy.

While the embodiments of this invention shown and described are fully capable of achieving the objects and advantages desired, such embodiments are for purposes of illustration only and not for purposes of limitation.

I claim:

1. Cold weather water facility comprising: an elongate tank having a first closed end and a second open end partially installed into ground with the first closed end located below the frost line in the ground and the second open end accessible from ground level; water source means intercommunicating from the exterior of the tank to the interior of the tank; water filling said tank to a water level position adjacent the second open end of said tank; and pipe means installed within said tank in such manner that water from the top of the tank is directed into a first open end of the pipe means adjacent the water level and flows downwardly in the pipe to a second open end of the pipe adjacent the closed end of the tank at which second open end the water flows out of the pipe and upwardly in the tank outside of the pipe.

2. The water facility of claim 1 in which the first open end of the pipe is connected to a funnel flaring outwardly from the pipe to an edge adjacent the open end of the tank.

3. The water facility of claim 1 in which the second open end of the pipe is shaped so as to create a Bernoulli effect.

4. Cold weather water facility comprising: an elongate tank having a first closed end and a second open end partially installed into ground with the first closed end located below the frost line in the ground and the second open end accessible from ground level; water source means intercommunicating from the exterior of the tank to the interior of the tank; water filling said tank to a water level position adjacent the second open end of said tank; and pipe means having insulated sleeve means about its portion above the frost line installed within said tank in such manner that water from the top of the tank is directed into a first open end of the pipe means adjacent the water level and flows downwardly in the pipe to a second open end of the pipe adjacent the closed end of the tank at which second open end the water flows out of the pipe and upwardly in the tank outside of the pipe and outside of the sleeve means.

5. The water facility of claim 4 in which the tank is surrounded by an insulating sleeve above the frost line.

6. Cold weather water facility comprising: an elongate tank having a first closed end and a second open end partially installed into ground with the first closed end located below the frost line in the ground and the second open end accessible from ground level; water source means intercommunicating from the exterior of the tank to the interior of the tank; water filling said tank to a water level position adjacent the second open end of said tank; pipe means having insulated sleeve means about its portion above the frost line installed within said tank in such manner that water from the top of the tank is directed into a first open end of the pipe means adjacent the water level and flows downwardly in the pipe to a second open end of the pipe adjacent the closed end of the tank at which second open end the water flows out of the pipe and upwardly in the tank outside of the pipe and outside of the sleeve means; and insulating sleeve means surrounding said tank means above the frost line.

7. The water facility of claim 6 in which the tank incorporates water filling means controlled by a diaphragm valve.

8. A method for preventing water in an outdoor container from freezing in freezing climates comprising: forming an elongate tank having a first closed end and a second open end; installing a pipe having a first open end and a second open end in said elongate tank with the first open end of said pipe adjacent the first closed end of said tank and its second open end adjacent the second open end of said tank; forming a funnel on the second open end of said pipe with the smallest diameter of the funnel identical to and extending from said second open end of said pipe and the largest diameter of said funnel terminating adjacent the interior of said open end of said tank; installing said tank into the ground such that the first closed end of said tank is below the frost line and the second open end of said tank is above ground level; installing water supply means into said tank; and filling said tank with water to a position adjacent the second open end of said tank.

9. The method of claim 8 wherein means to create a Bernoulli effect is installed adjacent the first open end of said pipe.

10. A method for preventing water in an outdoor container from freezing in freezing climates comprising: forming an elongate tank having a first closed end and a second open end; installing a pipe having a first open end and a second open end in said elongate tank with the first open end of said pipe adjacent the first closed end of said tank and its second open end adjacent the second open end of said tank; forming a funnel on the second open end of said pipe with the smallest diameter of the funnel identical to and extending from said second open end of said pipe and the largest diameter of said funnel terminating adjacent the interior of said open end of said tank; installing a sleeve about said pipe and funnel, said sleeve being at a spaced distance between said pipe and the interior perimeter of said tank and being attached to said funnel; attaching the sleeve to the pipe at a position which will be at the level of the frost line when installed in the ground; installing said tank into the ground such that the first closed end of said tank is below the frost line and the second open end of said tank is above ground level; installing water supply means into said tank; and filling said tank.

11. The method of claim 10 wherein means to induce a Bernoulli effect is installed adjacent said pipe/funnel/sleeve assembly.

\* \* \* \* \*